US007884754B1

(12) United States Patent
Alouani et al.

(10) Patent No.: US 7,884,754 B1
(45) Date of Patent: Feb. 8, 2011

(54) METHOD OF DISTRIBUTED ESTIMATION USING MULTIPLE ASYNCHRONOUS SENSORS

(75) Inventors: Ali T. Alouani, Cookeville, TN (US); John E. Gray, King George, VA (US); Denis Hugh McCabe, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 943 days.

(21) Appl. No.: 11/801,764

(22) Filed: Apr. 27, 2007

Related U.S. Application Data

(60) Provisional application No. 60/797,082, filed on Apr. 28, 2006.

(51) Int. Cl.
*G01S 13/00* (2006.01)
(52) U.S. Cl. .............................. 342/95; 342/59; 342/189
(58) Field of Classification Search .................... 342/95
See application file for complete search history.

(56) References Cited

U.S. PATENT DOCUMENTS

| | | | | |
|---|---|---|---|---|
| 5,307,289 | A | 4/1994 | Harris | 364/516 |
| 5,798,942 | A * | 8/1998 | Danchick et al. | 342/96 |
| 6,157,894 | A * | 12/2000 | Hess et al. | 702/54 |
| 6,567,037 | B1 | 5/2003 | Fung et al. | 342/29 |
| 6,718,259 | B1 * | 4/2004 | Khosla | 701/200 |
| 6,992,626 | B2 | 1/2006 | Smith | 342/454 |
| 7,522,091 | B2 * | 4/2009 | Cong et al. | 342/70 |
| 7,558,533 | B2 * | 7/2009 | Cozzo et al. | 455/65 |
| 7,574,057 | B1 * | 8/2009 | Yang | 382/232 |
| 2005/0185826 | A1 | 8/2005 | Georgescu et al. | 382/103 |
| 2006/0028552 | A1 * | 2/2006 | Aggarwal et al. | 348/169 |
| 2007/0288156 | A1 * | 12/2007 | Neff et al. | 701/202 |

OTHER PUBLICATIONS

Alouani, A.T.; Rice, T.R.; , "Asynchronous track fusion revisited." Proceedings of the Twenty-Ninth Southeastern Symposium on System Theory. pp. 118-122. Mar. 9-11, 1997.*
Alouani, A.T.; Rice, T.R.; , "On optimal asynchronous track fusion." First Australian Data Fusion Symposium, 1996. pp. 147-152. Nov. 21-22, 1996.*
Shuli Sun; , "Multi-Sensor Weighted Fusion Suboptimal Filtering for Systems with Multiple Time Delayed Measurements," The Sixth World Congress on Intelligent Control and Automation, 2006. vol. 1. pp. 1617-1620. Oct. 23, 2006.*
A. T. Alouani et al., "Theory of Distributed Estimation using Multiple Asynchronous Sensors", *Transactions on Aerospace and Electronic Systems* v. 41, No. 2, Apr. 2005, pp. 717-722, ISSN: 0018-9251, INSPEC Accession No. 8491396, DOI: 10.1109/TAES.2005.1468761, Posted online: Jul. 25, 2005 08:17:12.0.

\* cited by examiner

*Primary Examiner*—Thomas H Tarcza
*Assistant Examiner*—Matthew M Barker
(74) *Attorney, Agent, or Firm*—Gerhard W. Thielman, Esq.

(57) ABSTRACT

A method and system are provided for merging data from a plurality of multiplexed measurement sources to a decision-maker. The method includes operations for receiving a corresponding plurality of measurements of the data, processing each measurement to respectively obtain local state estimates and local error covariances, determining a corresponding plurality of lag periods, offsetting each of the corresponding event times, supplying to a track fusion center the local state estimates and the local error covariances for summing the pluralities of the local state estimates as a fusion state estimate and the local error covariances as a fusion error covariance. The measurements to be fused are each acquired from its respective source and correspond to an associated sampling period within an acquisition interval. The lag periods represent a wait duration for obtaining the corresponding local state estimates and local error covariances. The system correspondingly includes a receiver to obtain the plurality of measurements, a set of associated processors to analyze the measurements and provide their local state estimates and the local error covariances; a time-offsetter to determine corresponding lag periods and displace each of the event times accordingly, and the track fusion center.

9 Claims, 1 Drawing Sheet

METHOD OF DISTRIBUTED ESTIMATION USING MULTIPLE ASYNCHRONOUS SENSORS

CROSS REFERENCE TO RELATED APPLICATION

Pursuant to 35 U.S.C. §119, the benefit of priority from provisional application 60/797,082, with a filing date of Apr. 28, 2006, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefore.

BACKGROUND

Field of the Invention

The invention relates generally to a method for merging information about a target relative to a plurality of observers. In particular, the information represents relational characteristics such as position, velocity, acceleration based on range, azimuth and elevation with faster real-time response and reduced error compared to conventional techniques.

Threat assessment for decision-makers in the armed forces represents a vital element in detecting, assessing and engaging an approaching target. An observer may have one or more sensors (e.g., radar) that may have a different rate to determine entrance of an object within an observation perimeter. Upon such detection, a decision-maker may seek translational characteristics of the object to interpret the threat level posed therefrom. Such characteristics may include positional information of the object, such as range, azimuth and elevation relative to the sensor's vantage. Additional such characteristics may include change rate information such as speed and direction (i.e., velocity) of the approaching object at various levels of fidelity depending on the type of information sought. Identification of the object may include determining whether the object is friendly, neutral or hostile.

A conclusion of the object's hostility may necessitate a finer resolution (i.e., reduced uncertainty and time-delay) of positional relationships relative to the observers (i.e., sensors) available to the decision-maker. The more refined detail enables creation of a firing solution to engage the object, now declared a target. Such efforts to achieve such decisions and consequent engagement constitute tracking. The United States Navy employs the Aegis Combat System to coordinate data acquisition, interpretation and decision-making.

The Soviet Union's dissolution has led to a number of unforeseen consequences that are of concern to the United States military. The problem of particular concern to the United States Navy is the proliferation of inexpensive Theater Ballistic Missiles (TBMs) and Anti-Ship Ballistic Missiles (ASCMs) to unstable and hostile Third World countries. With troops likely to be deployed in such situations to defend both Allied and American interests, a rapidly evolving need exists for the Navy to operate effectively in littoral environment. The Navy has been designed to operate in a blue-water environment against a Soviet-style threat. Naval adaptability is such that there can be a redeployment to the new environment provided that there is some sharing of data among the multiple sensor/weapons platforms (e.g., Aegis-equipped platforms, such as cruisers and destroyers primarily).

SUMMARY

Tracking with multiple sensors has long been recognized as an effective method to obtain an accurate picture of a surveillance area of interest. The use of multiple sensors poses challenging problems in term of communications and processing. To generate a common picture at the different nodes, all the sensor data must be processed simultaneously by all of the nodes. Performing sequential processing represents the optimal method of processing the data. However, this requires that all the nodes receive the same data, at the same time, and without delays. A real-time optimal solution to the tracking problem may not be feasible due to the large amount of data to be distributed, the different variety of sensors, and the limited bandwidth of current communications systems.

Conventional multiple-sensor tracking yield disadvantages addressed by various exemplary embodiments of the present invention. In particular, various exemplary embodiments provide a method for merging data from a plurality of multiplexed measurement sources to a decision-maker. The method includes operations for receiving a corresponding plurality of measurements of the data, processing each measurement to respectively obtain local state estimates and local error covariances, determining a corresponding plurality of lag periods, offsetting each of the corresponding event times, supplying to a track fusion center the local state estimates and the local error covariances for summing the pluralities of the local state estimates as a fusion state estimate and the local error covariances as a fusion error covariance. The measurements to be fused are each acquired from its respective source and correspond to an associated sampling period within an acquisition interval. The lag periods represent a wait duration for obtaining the corresponding local state estimates and local error covariances.

Various exemplary embodiments provide a system that correspondingly includes a receiver to obtain the plurality of measurements, a set of associated processors to analyze the measurements and provide their local state estimates and the local error covariances, a time-offsetter to determine corresponding lag periods and displace each of the event times accordingly, and the track fusion center.

In various exemplary embodiments include calculating a corresponding plurality of weighting factors and multiplying them to each respective local state estimate, and then summing the weighted state estimates for the fusion state estimate. Various additional embodiments include summing the local error covariances as the fusion error covariance by minimizing a mean square error term.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
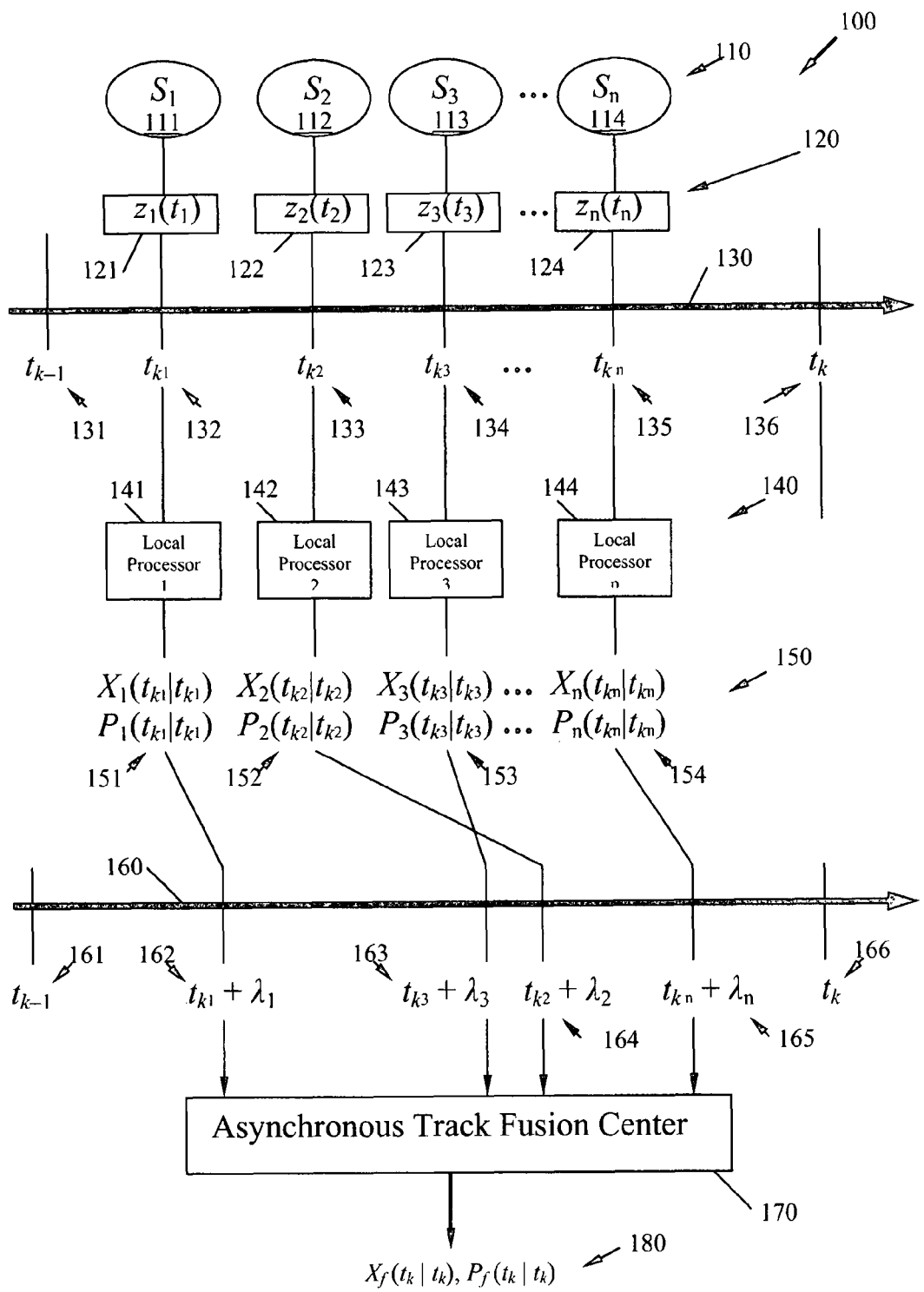
FIG. 1 is a block diagram view of an asynchronous track fusion architecture.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

This disclosure is organized in the order of: (i) introduction; (ii) advantages of the inventive approach; (iii) description of the asynchronous track fusion problem; (iv) calculation of weighted matrices to express the covariance matrix; (v) an asynchronous multisensor track fusion filter that yields an analytical minimum mean square solution for an arbitrary number of asynchronous tracks; (vi) a description of the architectural diagram with timeline to provide the solution; (vii) application for tracking multiple targets with multiple sensors; (viii) derivation of the Bar-Shalom—Campo fusion rule as a simplified example case of the fusion algorithm; (ix) concluding remarks; and (x) appendices for proofs.

Introduction: New processing techniques need to be pursued in order to effectively take advantage of the abundance of multiple sensor data while considering such issues as communication delays, data arriving out of sequence, the bursty nature of the data (i.e., sudden arrival of information bursts before and after long stasis intervals). Such filtering techniques are known as asynchronous multi-sensor fusion approaches. With data sharing among the sensor platforms, many of the problems associated with the littoral environment can be mitigated by well-designed algorithms. The most important use of such data enables an effective picture of the battle-space environment to be formed that minimizes the problems of miscorrelations between threats and friendlies, creation of false tracks, increased battle-space awareness, and improved reaction time against high speed TBMs and low observable targets, such as ASCMs.

The idealized single integrated air picture (SIAP) is described as a common picture of the threat environment from the viewpoint of an omniscient observer (God's viewpoint) shared to the widest possible extent (or even cloned if possible) among every sensor and weapons node that constitutes the SIAP network. This common tactical picture would be displayed to decision-makers as well as shooters at all levels across the node. This becomes a difficult problem to solve for real-time applications when there is a large amount of data being distributed across the network. Additional difficulties occur when the sensors are dissimilar and with the limited bandwidth of current communication systems.

For an idealized "system-of-the-combat-system" the data from the individual sensors may be propagated to processing node(s) on a variety tactical platforms by a communication network. For each node a, there is a node b, such that b=1, 2, . . . , N that may be connected to node a. A message sent from node a to a specific element, say M, arrives at a time which differs from its arrival time at N, so that $t_{aN} \neq t_{aN}$. Furthermore, the network being temporally associative is not always a valid assumption, so $t_{aN} \neq t_{aM}$. Because of this problem, the data are not well-ordered. Merely because the data from sensor a are received before the data from sensor b, does not imply that the measurement or track data from sensor a are "earlier" than sensor data from sensor b. The data are not inherently time ordered. Because the sensors can have different data rates, they measure the target position and/or velocity at different times. Hence the data are asynchronous. The rate of data arrival not being exactly periodic represents another adverse temporal feature of the data. Real-time systems are only approximately periodic, so the variation in the rate of arrival resembles a Poisson process about the mean. (Some literature refers to this as "bursty" message traffic, i.e., subject to episodic eruption of events in an otherwise stasis background.) The temporal nature of the message traffic across shared data networks may be best described in general as delayed, Poisson, and asynchronous.

Most attempts to generate a composite track have been based on the assumption that the data are ordered sequentially and that an estimation algorithm such as the Kalman filter or the interactive multiple model (IMM) filter can be applied to process the data as they arrive at the processing node in real time. Given the actual nature of the data, this poses a significant difficulty because in most cases the data that arrive from individual sensors are not temporally ordered, which eliminates the possibility of optimally processing the data. Asynchronous data can produce a tactical picture that is inconsistent with reality when compared to properly ordered data. An alternative to the batch processing approach is to window the data within a fixed time interval and process all the data in a manner that allows for optimal processing. That process involves a first step to properly time order the data.

Conventional fusion methods use a single processor to process all of the different sensor data sequentially from a given target. The proposed multi-sensor fusion approach uses a two-level processing scheme comprised of local and global processing levels. At the local level, each processing node processes its local data in real-time and produces a local track at the time when the local data were acquired. These local tracks are then communicated, at different times, to a fusion center for further processing. The fusion process waits for an appropriate and/or adaptive time before fusing all of the incoming tracks into a global track for a given target. The time between updates at the fusion center depends on such factors as the computational loading of the processors, the communication delays between local processing nodes and the track fusion node, the type of motion of the target, etc.

The use of multiple sensors for state estimation can lead to better quality estimates than when a single sensor is used. For the same number of resources, sensors with different data rates (i.e., asynchronous sensors) can provide better coverage than synchronous sensors. The local estimates produced by asynchronous sensors are not time coincident. In the, presence of communication delays between sensor platforms and fusion center and in the presence of out-of-sequence data, the optimal centralized processing architecture may not be feasible in real time.

Taking into consideration the computational load sharing and the survivability of the system, the distributed estimation approach becomes an attractive alternative. On the other hand, current distributed estimation architectures assume that the sensors used are synchronous and no communication delays exist between the fusion center and sensor platforms. Many of the existing track fusion algorithms are optimal only for synchronized tracks. In order to perform synchronous track fusion when practical asynchronous sensors are used, the local estimates have to be synchronized at a considerable additional processing and computational cost.

Track fusion (also known as distributed filtering) represents the merging of state-estimates or tracks from multiple sensors, distinguishable either by type of measurement acquired or vantage relative to target. The information acquired thereby can vary according to several parameters, such as signal-to-noise quality, range resolution, azimuth and elevation resolutions, distinction over clutter, etc.

However, out-of-sequence tracks have not been considered in the literature when dealing with distributed estimation. The advantages from various embodiments of this invention include solving a general sensor-to-sensor track fusion problem that is directly applicable to an arbitrary number of asynchronous tracks where communication delays exist between sensor platforms and fusion center and where some of the tracks arrive out-of-sequence. The track fusion solution is optimal in the minimum mean square sense for the proposed linear fusion rule. No special processing, such as prediction or smoothing is needed in the proposed solution to synchronize the local tracks. In addition, using the proposed batch processing approach, latent and out-of-sequence tracks can be included without additional processing and computational cost.

Advantages: The benefit to combining data generated from single sensor platforms to synthesize a common picture generated from the data from all the sensor platforms to create a more complete picture of the underlying operational environment are legion. A more complete and accurate picture that one can base actionable decisions upon, e.g., those decisions that lead to identification and characterization of a tracked object as well as deployment of weapons or other resources with high probability of success, has many advantages to the war-fighter. These advantages include:

- Reaction time is improved because the threat is detected earlier.
- A more unified understanding of the threat environment is available, so resources to engage threats can be better allocated.
- Better state estimates are available on threats, so their behavior can be better predicted, and therefore optimal engagement strategies developed.
- Environmental penetration is improved, due to different look angles at the same thereat, so favorable geometry can be taken advantage of by the war-fighter.
- The ability to lessen point failures due to reliance on single platform rather than multi-platform performance.

These are only some of the benefits of a unified operational environment that can only be synthesized from single platforms that share data to produce a common picture. This picture can be produced from either a track fusion or a data fusion approach to data gathered from single sensor platforms. The data fusion approach is too computational intensive and requires too much communication bandwidth for near term deployment on sensor platforms, so the track fusion approach is preferred. The proposed asynchronous track fusion deals with all the practical problems associated with track fusion in a real world environment that treats all of the difficulties with real world track fusion.

The Asynchronous Multi-Sensor Track Fusion Problem: Consider a dynamical system, such as a moving target, whose state evolves according to the following linear stochastic differential equation $$\dot{X}(t) = A X(t) + G \overline{W}(t), \quad (2.1)$$

where $X(t)$ is the continuous-time system state at time $t$ and $\hat{W}(t)$ is a zero mean white Gaussian process noise with covariance defined as $$E[\overline{W}(t)\overline{W}(\tau)'] = \overline{q}(t)\delta(t-\tau), \quad (2.2)$$

and the prime symbol ' denotes transpose.

Assume that the state of the system is observed by a finite but arbitrary number, m, of sensors that have different data rates. Let the discrete time measurement $z_i$ taken by sensor i, (i=1, 2, ..., m) at time $t_{ki}$ (within an interval k), be given by $$z_i(t_{k_i}) = H_i(t_{k_i})X(t_{k_i}) + V_i(t_{k_i}), \quad (2.3)$$

where $$X(t_{k_i}) = \Phi(t_{k_i}, t_{k_i-1})X(t_{k_i-1}) + W_{t_{k_i-1}}^{t_{k_i}} \quad (2.4)$$

$$\Phi(t_{k_i}, t_{k_i-1}) = e^{A(t_{k_i} - t_{k_i-1})} \quad (2.5)$$

$$W_{t_{k_i-1}}^{t_{k_i}} = \int_{t_{k_i-1}}^{t_{k_i}} \Phi(t_{k_i}, \tau) G \overline{W}(\tau) d\tau \quad (2.6)$$

$$E\left[W_{t_{k_i-1}}^{t_{k_i}} \left(W_{t_{k_i-1}}^{t_{k_i}}\right)'\right] = Q_{t_{k_i-1}}^{t_{k_i}} \quad (2.7)$$

$$Q_{t_{k_i-1}}^{t_{k_i}} = \int_{t_{k_i-1}}^{t_{k_i}} \Phi(t_{k_i}, \tau) G \dot{q}(\tau) G' \Phi(t_{k_i}, \tau)' d\tau, \quad (2.8)$$

such that $X(t_{ki})$ is the system state at time $t_{ki}$, $\phi(t_{ki}, t_{ki-1})$ is the transition matrix, W represents the state process noise, E represents the expected value, and Q represents the process noise covariance matrix.

The measurement noise $V_i(t_{ki})$ is a zero mean white Gaussian process with $$E[V_i(t_{k_i})V_i(t_{k_m})'] = R_i(t_{k_i})\delta_{t_{k_i}, t_{k_i}}, \quad (2.9)$$

where $t_{ki} = k_i T_i$, and $T_i$ is the sampling period of sensor i. Moreover, $R_i(t_{ki})$ represents sensor i noise covariance and $\delta$ is the Kronecker delta with respect to the time interval.

In target tracking applications, the system dynamics is linear in the Cartesian coordinates while the measurements are nonlinear function of the state. In such cases, the measurement model may be obtained by linearization around the state estimate.

Each sensor platform may be equipped with computational capability to maintain its own local track by processing the sensor measurements from eqn. (2.3) as they are received using the system dynamical model from eqn. (2.4). The local state estimate produced by processing the measurement $z_i(t_{ki})$ of sensor i, taken at time $t_{ki}$, is denoted by $X_i(t_{ki}|t_{ki})$. The Kalman filter update of such an estimate is given by $$X_i(t_{k_i} \mid t_{k_i}) = A_i(t_{k_i})\Phi(t_{k_i}, t_{k_i-1})X(t_{k_i-1} \mid t_{k_i-1}) + \quad (2.10)$$

$$K_i(t_{k_i})V_i(t_{k_i}) + K_i(t_{k_i})H_i(t_{k_i})\left[\Phi(t_{k_i}, t_{k_i-1})X_i(t_{k_i}) + W_{t_{k_i-1}}^{t_{k_i}}\right],$$

where $A_i(t_{ki}) = [I - K_i(t_{ki})H_i(t_{ki})]$, such that I is the identity matrix, $K_i(t_{ki})$ is the gain of the filter used to process the measurements acquired by platform i and $H_i(t_{ki})$ is the measurement matrix of sensor i.

The local state estimate error associated with sensor i at time $t_{ki}$ can be defined as a difference between the local state estimate and the system state.

$$\tilde{X}_i(t_{k_i}|t_{k_i}) = X_i(t_{k_i}|t_{k_i}) - X_i(t_{k_i}). \quad (2.11)$$

Substituting eqns. (2.4) and (2.6) into (2.11) enables the error in the estimate of local track i to be expressed as $$\tilde{X}_i(t_{k_i} \mid t_{k_i}) = \quad (2.12)$$

$$A(t_{k_i})\left[\Phi(t_{k_i}, t_{k_i-1})\tilde{X}(t_{k_i-1} \mid t_{k_i-1}) - W_{t_{k_i-1}}^{t_{k_i}}\right] + K(t_{k_i})V(t_{k_i}).$$

Depending on the individual data rate of the sensors within the fusion network, a sensor may obtain several measurements during a given time interval, while another sensor obtains none or only one measurement. The associated local processor updates the local track as many times as the number of measurements taken during that interval.

Calculation of Weighted Matrices: In order to improve the quality of the state estimate, local tracks are communicated from the sensors' platform to a central site for the purpose of estimation fusion. Various exemplary embodiments apply to an arbitrary communication rate. The sensor platforms can communicate their track after every update, after a given number of updates, or after every time period. Communication delays may exist between the sensor platforms and the fusion center. As an example, $t=t_{k-1}$, represents the last time the fusion center performed a track fusion, while $t_k = t_{k-1} + T_f$ represents the time of the next fusion time.

The period $T_f$ represents an adaptive design parameter. This period can be as small as the time necessary to receive two tracks from two different sensor platforms or as long as the time necessary to receive as many tracks as the total number of sensors in the network. The value of $T_f$ depends primarily on the priority given to the track fusion task, which depend on the application being processed. For example, in target tracking applications when a hostile target presents a high level of threat, the waiting time $T_f$ should be small compared to the case where the target is in a constant velocity mode.

The fusion rule in the described exemplary embodiments is applicable regardless of the value of $T_f$. For a case such that during the time interval $[t_{k-1}, t_k]$, a number of asynchronous tracks arrive at the fusion center. Because of communication delays, some of the tracks are generated during the time interval $[t_{k-1}, t_k]$ and some may have been generated during the interval $[t_{k-2}, t_{k-1}]$ and arrive during the interval $[t_{k-1}, t_k]$. Before the track fusion process takes place, some of the tracks may be removed. If more than one track generated by the same sensor is received, only the most recent track is used for fusion.

If only one track is received from a given sensor platform and was obtained during the time interval $[t_{k-2}, t_{k-1}]$, a decision has to be made whether to keep such track or not. This mainly depends on the data rate of the sensor, the sensor accuracy, as well as the respective age of that track. The tracks that will be kept for track fusion are called valid tracks.

Therefore, the number n of tracks to be fused during the interval $[t_{k-i}, t_k]$ is an arbitrary number between 2 and m, where m is the number of sensors used. Because of the difference in communication delays, some of the validated tracks may arrive out-of-sequence. To deal with the out-of-sequence tracks without special processing, all the tracks that arrive at the fusion center during the time $[t_{k-1}, t_k]$ after removing redundant tracks, are fused simultaneously. The asynchronous multi-sensor track fusion problem can be stated as follows:

Given a number of asynchronous valid tracks, $\{X_i(t_k|t_k), P_i(t_k|t_k)\}$, $i=1, 2, \ldots, n$, that arrive at the fusion center during the time interval $[t_{k-1}, t_k]$, find the best estimate in the minimum mean square sense of the system state at time $t_k$ when computed according to the fusion rule in eqn. (2.13).

$$X_f(t_{k_i}|t_{k_i}) = \sum_{i=1}^{n} L_i(t_{k_i}) X_i(t_{k_i}|t_{k_i}), \quad (2.13)$$

where the $L_i$'s are unknown matrices to be determined.

The error of the fused track at time $t_k = k\,T_f$ can be defined as $$\tilde{X}_f(t_k|t_k) = X_f(t_k|t_k) - X(t_k). \quad (2.14)$$

The equations for system dynamics (2.4) and the fusion rule (2.13) yields $$\tilde{X}_f(t_k|t_k) = \sum_{i=1}^{n} L_i \tilde{X}_i(t_{k_i}|t_{k_i}) + \left[\sum_{i=1}^{n} L_i \Phi(t_{k_i}, t_k) - I\right] X(t_k) + \\ - \sum_{i=1}^{n} L_i \Phi(t_{k_i}, t_k) W_{t_{k_i}}^{t_k}. \quad (2.15)$$

If all the local filters are unbiased, then second term of (2.15) is zero and the fused track is unbiased if the sum over all the tracks of weighted estimates is equal to the identity matrix:

$$\sum_{i=1}^{n} L_i \Phi(t_{k_i}, t_k) = I. \quad (2.16)$$

Eqn. (2.16) represents the first constraint on the choice of the weighting matrices. Solving for $L_n$ by using (2.16) yields the second constraint equation:

$$L_n = \Phi(t_{k_j}, t_{k_n}) - \sum_{i=1}^{n} L_i \Phi(t_{k_i}, t_{k_n}). \quad (2.17)$$

Inserting eqns. (2.16) and (2.17) into (2.15) allows rewriting the error in the fused track at time $t_k$ as $$\tilde{X}_f(t_k|t_k) = \sum_{i=1}^{n} L\big[\tilde{X}(t_{k_i}|t_{k_i}) - \\ \Phi(t_{k_i}, t_{k_n})\tilde{X}(t_{k_n}|t_{k_n}) - \Phi(t_{k_i}, t_k)\{W_{t_{k_i}}^{t_k} - W_{t_{k_n}}^{t_k}\}\big] + \\ \Phi(t_{k_i}, t_{k_n})\tilde{X}(t_{k_n}|t_{k_n}) - W_{t_{k_n}}^{t_k}. \quad (2.18)$$

The error covariance matrix of the fused track $P_f$ can consequently be defined as $$P_f(t_k|t_k) = E\{\tilde{X}_g(t_k|t_k)\tilde{X}_f(t_k|t_k)'\}, \quad (2.19)$$

enabling determination of the weights $L_i$ that define the optimal asynchronous track fusion filter.

The Asynchronous Multisensor Track Fusion Filter: There are two steps to solving the asynchronous track fusion problem outlined in the previous section. First, the covariance matrix of the fused track may be expressed as a function of the weight matrices $L_i$ using the fusion rule in eqn. (2.13). Second, the matrices may be analytically determined by minimizing the mean square error of the fused track.

For $1 \leq i < n-1$ and $1 \leq j \leq n-1$, define $$M_{ij} = P_{ij}(t_{k_i}, t_{k_j}) + \Phi(t_{k_i}, t_{k_n})\,[P_{nn}(t_{k_n}, t_{k_n}) + Q_w(t_{k_i}, t_{k_j}, t_{k_n})]\Phi(t_{k_j}, t_{k_n})' - P_{in}(t_{k_i}, t_{k_n})\Phi(t_{k_j}, t_{k_n})' - \Phi(t_{k_i}, t_{k_n})P_{nj}(t_{k_n}, t_{k_j}) - P_{xw}(t_{k_i}, t_{k_j})\Phi(t_{k_j}, t_k)' - \Phi(t_{k_i}, t_k)P_{xw}(t_{k_i}, t_{k_j})' + \Phi(t_{k_i}, t_{k_n})P_{xw}(t_{k_n}, t_{k_j})\Phi(t_{k_j}, t_k)' + \Phi(t_{k_i}, t_k)P_{xw}(t_{k_n}, t_{k_j})'\Phi(t_{k_j}, t_{k_n})' \quad (3.1)$$

$$M_n = \Phi(t_k, t_{k_n})P(t_{k_n}, t_{k_n})\Phi(t_k, t_{k_n})' + Q_{t_{k_n}}^{t_k} \quad (3.2)$$

$$N_i = P_{in}(t_{k_i}, t_{k_n})\Phi(t_k, t_{k_n})' - \Phi(t_{k_i}, t_{k_n})[P_{nn}(t_{k_n}, t_{k_n}) - Q_{t_{k_i}}^{t_{k_n}}]\Phi(t_k, t_{k_n})' \quad (3.3)$$

$$P_{ij}(t_{k_i}, t_{k_j}) = A(t)[\Phi(t_{k_i}, t_{k_i-1})P(t_{k_i-1}, t_{k_j-1})\Phi(t_{k_j}, t_{k_j-1})' + Q_c(t_{k_i}, t_{k_j})]A_j(t_{k_j})' + K_i(t_{k_i})R_i(t_{k_i})K_j(t_{k_j})'\delta_{ij}, \quad (3.4)$$

where $$Q_w(t_{k_i}, t_{k_j}, t_{k_n}) = \begin{cases} Q_{t_{k_i}}^{t_{k_n}} & \text{if } t_{k_i} \geq t_{k_j} \\ Q_{t_{k_j}}^{t_{k_n}} & \text{if } t_{k_i} \geq t_{k_j} \end{cases} \quad (3.5)$$

$$P_{xw}(t_{k_i}, t_{k_j}) = \begin{cases} 0 & \text{if } t_{k_i} \leq t_{k_j} \\ -A(t_{k_i})Q_{t_{k_j}}^{t_{k_i}}\Phi(t_k, t_{k_i})' & \text{if } t_{k_j-1} < t_{k_j} \leq t_{k_i} \\ -A(t_{k_i})Q_{t_{k_j-1}}^{t_{k_i}}\Phi(t_k, t_{k_i})' & \text{if } t_{k_j} \leq t_{k_i-1} \end{cases} \quad (3.6)$$

and $Q_c$ is defined in eqn. (A.17) in Appendix A.

The solution to the first step is to analytically determine the error covariance matrix.

Theorem 1: The error covariance matrix of the fused track using the fusion rule in eqn. (2.13) is given by $$P_f(k|k) = \sum_{i=1}^{n-1}\sum_{j=1}^{n-1} L_i M_{ij} L_j' + \sum_{i=1}^{n-1} L_i N_i + \sum_{i=1}^{n-1} N_i' L_i' + M_n. \quad (3.7)$$

For the Proof, see Appendix A.

Additionally, for the actual solution of the problem, the matrices can be defined as $$M = \begin{bmatrix} M_{11} & M_{12} & M_{13} & \cdots & M_{1,n-1} \\ M_{21} & M_{22} & M_{23} & \cdots & M_{2,n-1} \\ \vdots & & \ddots & & \vdots \\ M_{n-1,1} & M_{n-1,2} & M_{n-1,3} & \cdots & M_{n-1,n-1} \end{bmatrix} \quad (3.8)$$

$$N = \begin{bmatrix} N_1 \\ N_2 \\ \vdots \\ N_{n-1} \end{bmatrix}, \quad (3.9)$$

where matrix $M_{ij}$ and array $N_i$ are respectively defined in eqns. (3.1) and (3.3), for $1 \leq i \leq n-1$ and $1 \leq j \leq n-1$.

Theorem 2: The minimum mean square solution of the asynchronous track fusion problem using the fusion rule in eqn. (2.13) is given by $$X_f(t_k|t_k) = \sum_{i=1}^{n} L_i X_i(t_{k_i}|t_{k_i}) \quad (3.10)$$

$$P_f(t_k|t_k) = LML' + LN + N'L' + M_n, \quad (3.11)$$

where $$[L_1 \quad L_2 \quad \cdots \quad L_{n-1}] = -N'M^{-1} \text{ and} \quad (3.12)$$

$$L_n = \Phi(t_{k_j}, t_{k_n}) - \sum_{i=1}^{n-1} L_i \Phi(t_{k_i}, t_{k_n}). \quad (3.13)$$

For the Proof, see Appendix B.

In the proposed sensor-to-sensor asynchronous track fusion rule, the fusion result at time $t_{k-1}$ is not included in the fusion at time $t_k$. Another possible fusion rule can include the previous fusion result as follows:

$$X_f(t_k|t_k) = \sum_{i=1}^{n} L_i X_i(t_{k_i}|t_{k_i}), \quad (3.14)$$

where for i=0, $$X_0(t_{k_0}|t_{k_0}) = X_f(t_{k-1}|t_{k-1}). \quad (3.15)$$

In Theorem 1, the sensor observation errors are assumed to be uncorrelated. In cases where the observation noises are coupled across sensors, the only modification needed is in the cross covariance matrix $P_{ij}$. In such cases $P_{ij}(t_{ki}, t_{kj})$ of eqn. (3.4) is replaced with $$P_{ij}(t_{k_i}, t_{k_j}) = A_i(t_{k_i})[\Phi(t_{k_i}, t_{k_i-1})P_{ij}(t_{k_i-1}, t_{k_j-1})\Phi(t_{k_j}, t_{k_j-1}) + Q_c(t_{k_i}, t_{k_j})]A_j(t_{k_j})' + K_i(t_{k_i})[R_i(t_{k_i})\delta_{ij} + \tilde{R}(t_{k_i}, t_{k_j})]K_j(t_{k_j})' \quad (3.16)$$

where $\tilde{R}_{ij}(k_i)$ represents the correlation across sensors.

FIG. 1 shows a block diagram of an asynchronous track fusion architecture 100. An instrumentation source set 110 provides an n plurality of multiplexed sources $S_1$, $S_2$, $S_3$, ..., $S_n$. These sources may be identified by the labeled instrumentation $S_1$ as 111, $S_2$ as 112, $S_3$ as 113 and $S_n$ as 114. Each source $S_i$ provides a corresponding measurement $z_i$ and corresponding to a time $t_i$ within an interval, where i= 1, 2, 3, ..., n. These measurements provide a measurement set 120 for $z_i$ as 121, $z_2$ as 122, $z_3$ as 123 and $z_n$ as 124.

These measurements are obtained within a time interval between $t_{k-1}$ and $t_k$, as shown on a timeline 130. The initial interval time $t_{k-1}$ is marked 131. The first measurement is obtained at time $t_{k1}$ marked 132. The second measurement is obtained at time $t_{k2}$ marked 133. The third measurement is obtained at time $t_{k3}$ marked 134. The $n^{th}$ measurement is obtained at time $t_{kn}$ marked 135. The final interval time $t_k$ is marked 136.

A set of local processors 140 provides the continuous time system state $X_i$ and the error covariance matrix $P_i$ for each measurement, i=1, 2, 3, ..., n. Note that the local state estimate denoted by $X_i(t_{ki}|t_{ki})$ may be produced by processing the measurement $z_i(t_{ki})$ of sensor i obtained at time $t_{ki}$, and expressed in eqn. (3.10) for the minimum mean square solution. Similarly, the error covariance denoted by $P_i(t_{ki}|t_{ki})$ may be processed by the expression in eqn. (3.11). Each measurement $z_i$ and corresponding time $t_{ki}$, is provided with a local processor, such that the first, second, third and $n^{th}$ measurement and time are received in the first, second, third and $n^{th}$ local processors as 141, 142, 143 and 144, respectively. These processors provide a set 150 of the state and covariance values for the first, second, third and $n^{th}$ sets as 151, 152, 153 and 154, respectively. Note that in this embodiment, the local processors implement a Kalman filter to process the local measurements.

Depending on system transmission conditions, the values for the state estimate and error covariance may not arrive sequentially for track fusion. Each value may be delayed by a corresponding lag time $\lambda_i$. For example, a timeline 160 begins at initial interval time $t_{k-1}$ marked 161. The first values may be received at time $t_{k1}+\lambda_1$ marked 162; the third values at time $t_{k3}+\lambda_3$ marked 163; the second values at $t_{k2}+\lambda_2$ marked 164; and the nth value at $t_{kn}+\lambda_n$ marked 165. Note that the second values are received subsequent to the third values due to the much longer second lag time $\lambda_2$ as compared to third lag time $\lambda_3$. The values are input to an asynchronous track fusion center 170 to yield the fusion values $X_f(t_k|t_k)$ and $P_f(t_k|t_k)$ marked as 180, for merging local values from measurements i=1, 2, 3, ... , n.

Application -Multitarget-Multisensor Tracking: Multi-target single sensor tracking has developed over many years as sensor capability has expanded. Tracking algorithms have evolved from alpha-beta filters to interactive multiple model filters in more recent years. While the algorithm proposed in this work does not affect single platform multi-target tracking, it does affect target tracking capability when information is being passed back and forth between different platforms in an attempt to synthesize a common air picture, what has been termed by some as a single integrated air picture SIAP. The process incorporating the algorithm described herein represents an enabling technology to synthesize an improved air picture that more closely resembles the operational reality, rather than current technology which involves many oversimplifications. The picture produced by current technology provides a scene that is further in the past than desirable for real-time decision-making. The algorithm presented herein enables a picture to be produced that has fewer latencies and time delays, as well as less uncertainty. The result is a SIAP that is closer to real-time and less "fuzzy" (i.e., more definitive).

Special Case Example—The Bar-Shalon—Compo Fusion Rule: For the case of two asynchronous sensors that arrive at the fusion center, two local estimates can be used to calculate a global estimate. Using Theorem 1 for n=2, the fused track is provided explicitly by $$X_f(t_k|t_k) = L_1 X_1(t_{k_1}|t_{k_1}) + L_2 X_2(t_{k_2}|t_{k_2}) \quad (3.17)$$

$$P_f(t_k|t_k) = L_1 M_{11} L'_1 + L_1 N_1 + N'_1 L'_1 + M_2, \quad (3.18)$$

where $$L_1 = -N'_1 M_{11}^{-1} \quad (3.19)$$

$$L_2 = \phi(t_{k_1}, t_{k_2}) - L_1 \phi(t_{k_1}, t_{k_2}) \quad (3.20)$$

$$M_{11} = P_{11} + \phi(t_{k_1}, t_{k_2})[P_{22} + Q_w(t_{k_1}, t_{k_1}, t_{k_2})]\phi(t_{k_1}, t_{k_2})' - P_{12}(t_{k_1}, t_{k_2})\phi(t_{k_1}, t_{k_2})' - \phi(t_{k_1}, t_{k_2})P_{21}(t_{k_2}, t_{k_1}) - P_{xw}(t_{k_1}, t_{k_1})\phi(t_{k_1}, t_{k_1})' - \phi(t_{k_1}, t_{k_1})P_{xw}(t_{k_1}, t_{k_1})' + \phi(t_{k_1}, t_{k_2})P(t_{k_2}, t_{k_1})\phi(t_{k_1}, t_{k_1})' + \phi(t_{k_1}, t_{k_1})P(t_{k_1}, t_{k_2})\phi(t_{k_1}, t_{k_2})' \quad (3.21)$$

$$N_1 = P_{12}(t_{k_1}, t_{k_2})\Phi(t_k, t_{k_2})' - \Phi(t_{k_1}, t_{k_2})\left[P_{22}(t_{k_2}, t_{k_2}) - Q_{t_{k_1}}^{t_{k_2}}\right]\Phi(t_k, t_{k_2})' \quad (3.22)$$

$$M_2 = \Phi(t_k, t_{k_2}) P_{22} \Phi'(t_k, t_{k_2}) + Q_{t_{k_2}}^{t_k}. \quad (3.23)$$

The condition in which the two sensors are synchronous and there are no communication delays between sensor platforms and fusion center, then $t_{k1}=t_{k2}=t_k$, and $$\phi(t_{k_i}, t_{k_j}) = \phi(t_k, t_k) = 1 \quad (3.24)$$

$$Q_{t_{k_i}}^{t_{k_j}} = Q_{t_k}^{t_k} = 0 \quad (3.25)$$

$$P_{xw}(t_{k_1}, t_{k_2}) = P_{xw}(t_k, t_k) = 0 \quad (3.26)$$

Eqns. (3.21)-(3.23) and (3.19)-(3.20) reduce, respectively to $$M_{11} = P_{11} + P_{22} - P_{12} - P_{21} \quad (3.27)$$

$$N_1 = P_{12} - P_{22} \quad (3.28)$$

$$M_2 = P_{22} \quad (3.29)$$

$$L_1 = [P_{22} - P_{21}][P_{11} + P_{22} - P_{12} - P_{21}]^{-1} \quad (3.30)$$

$$L_2 = I - L_1 = (P_{11} - P_{12})[P_{11} + P_{22} - P_{12} - P_{21}]^{-1} \quad (3.31)$$

and the fused track eqns. (3.17)-(3.18) becomes $$X_f(k|k) = X_2(k|k) + (P_{22} - P_{21})[P_{11} + P_{22} - P_{12} - P_{21}]^{-1}[X_1(k|k) - X_2(k|k)] \quad (3.32)$$

$$P_f(k|k) = P_{22} - (P_{22} - P_{21})[P_{11} + P_{22} - P_{12} - P_{21}]^{-1}[P_{22} - P_{12}]. \quad (3.33)$$

Eqns. (3.32)-(3.33) are known as the Bar-Shalom—Campo fusion rule. See, e.g., Y. Bar-Shalom and L. Campo, "The Effect of the Common Process Noise on the Two-Sensor Fused Track covariance", *IEEE Trans. Aerospace & Electronic Systems,* vol. AES-22, no. 6, November 1986, pp. 803-805. The case of a plurality of n synchronous sensors can be derived following the same steps.

Concluding Remarks: Various exemplary embodiments provide the solution to a general asynchronous sensor-to-sensor linear distributed estimation problem. On the theoretical level, these embodiments solve three problems in one step: fusing asynchronous tracks without the need for synchronization, dealing with out-of-sequence tracks, as well as accounting for latent tracks. The proposed fusion rule is optimal in the minimum mean square sense.

On the practical level, sensor-to-sensor track fusion can now be performed without the additional computational cost of track synchronization. In addition, using the disclosed solution, the user can include latent and out-of-sequence data in the fusion process without filter re-initialization or back tracking. The rule also applies in the cases when the observation errors are correlated across sensors. In various embodiments, the focus is on sensor-to-sensor track fusion architecture. Other architectures including sensor-to-sensor track fusion with prior and sensor-to-sensor track fusion with feedback can be handled by simple modifications of these embodiments without departing from the spirit of the invention.

Thus, the method and system provided solves an asynchronous sensor-to-sensor track fusion problem using a linear fusion rule. Typical assumptions concerning synchronous operations are removed from the formulation, so the more realistic operational environment is treated in real-time that the sensors data updates are asynchronous. Effectively this means that the algorithm is designed to handle communication delays that exist between sensor platforms and track fusion center, track data can arrive out-of-sequence of the actual time sequence that they were collected. Based on these strenuous real-world operational conditions that occur in the Navy as well as for some type of air platforms, the asynchronous track fusion algorithm described herein deals with all of these contingencies.

For the proposed linear fusion rule, the solution is shown to be optimal in the minimum mean square sense. The fusion rule does not necessitate the synchronization of tracks for the purpose of track fusion. The batch processing of incoming tracks provides an elegant solution for the out-of-sequence and latent tracks without special processing of such data. Previous fusion rules, have been demonstrated to be a special case of this rule: the Bar-Shalom—Campo fusion rule that has been commonly applied to two target track fusion problems represents a special case of the asynchronous track fusion algorithm. Furthermore, this algorithm applies not only to track fusion but can also be extended to apply to any other type of state fusion problem.

Appendix A—Proof of Theorem 1: Assume that during the time $[t_{k-1}, t_k]$, an arbitrary number, n, of asynchronous tracks arrive at the fusion center. Using eqns. (2.18) and (2.19), the error covariance matrix of the fused track is given by $$P(t_k | t_k) = \qquad (A.1)$$

$$\sum_{i=1}^{n-1}\sum_{j=1}^{n-1} L_i \left\{ \begin{array}{l} P_{ij}(t_{k_i}, t_{k_j}) + \Phi(t_{k_i}, t_{k_n}) P_{nj}(t_{k_n}, t_{k_n}) \Phi(t_{k_j}, t_{k_n})' + \\ -P_{in}(t_{k_i}, t_{k_n}) \Phi(t_{k_j}, t_{k_n})' - \Phi(t_{k_j}, t_{k_n}) P(t_{k_n}, t_{k_j}) + \\ -E\left[\tilde{X}_i(t_{k_i}, t_{k_j})\left(W_{t_{k_j}}^{t_k}\right)'\right] \Phi(t, t)' + \\ -\Phi(t_{k_i}, t_k) E\left[W_{t_{k_i}}^{t_k} \tilde{X}_j(t_{k_j}, t_{k_j})'\right] + \\ \Phi(t_{k_i}, t_{k_n}) E\left[\tilde{X}(t_{k_n}, t_{k_n})'\left(W_{t_{l_j}}^{t_k}\right)'\right] \Phi(t_{k_j}, t_{k_n})' + \\ \Phi(t_{k_i}, t_k) E\left[\left(W_{t_{k_i}}^{t_k}\right)' \tilde{X}(t_{k_n}, t_{k_n})'\right] \Phi(t_{k_j}, t_{k_n})' + \\ \Phi(t_{k_i}, t) E\left[\left(W_{t_{k_i}}^{t_k} - W_{t_{k_n}}^{t_k}\right)\left(W_{t_{l_j}}^{t_k} - W_{t_{k_n}}^{t_k}\right)'\right] \Phi(t_{k_j}, t_k)' \end{array} \right\}$$

$$L_i' +$$

$$\sum_{i=1}^{n-1} L_i \left\{ \begin{array}{l} P(t_{k_i}, t_{k_n}) \Phi(t_k, t_{k_n})' + \Phi(t_{k_i}, t) E\left[W_{t_{k_i}}^{t_k}\left(W_{t_{k_n}}^{t_k}\right)'\right] + \\ -\Phi(t_{k_i}, t_{k_n}) P(t, t_{k_n}) \Phi(t, t_{k_n})' + \\ -\Phi(t_{k_i}, t_{k_n}) E W_{t_{k_i}}^{t_k} \tilde{X}(t_{k_n} | t_{k_n})' \Phi(t, t_{k_n})' + \\ -\Phi(t_{k_i}, t_k) Q_{t_{k_n}}^{t_k} \end{array} \right\} +$$

$$\sum_{i=1}^{n-1} \left\{ \begin{array}{l} \Phi(t_k, t_{k_n}) P_{ni}(t_{k_n}, t_{k_i}) + E\left[W_{t_{k_n}}^{t_{k_n}}\left(W_{t_{k_i}}^{t_k}\right)'\right] \Phi(t_{k_i}, t_k)' + \\ -\Phi(t_k, t_{k_n}) P_{nn}(t_{k_n}, t_{k_n}) \Phi(t_{k_i}, t_k)' + \\ -\Phi(t_k, t_{k_n}) E\left[\tilde{X}(t_{k_n} | t_{k_n})\left(W_{t_{k_i}}^{t_k}\right)'\right] \Phi(t_{k_i}, t_k)' + \\ -Q_{t_{k_n}}^{t_k} \Phi(t_{k_i}, t_k)' \end{array} \right\} L_i' +$$

$$\Phi(t_k, t_{k_n}) P_{nnn}(t_{k_n}, t_{k_n}) \Phi(t_k, t_{k_n})' + Q_{t_{k_n}}^{t_k}$$

To simplify the expression for $P_f(k|k)$, the expectation terms may be evaluated in eqn. (A.1). Using eqn. (2.6) for $t_{ki} \leq t_{kj}$, $$W_{t_{k_i}}^{t_k} = \int_{t_{k_i}}^{t_k} \Phi(t_k, \tau) G\overline{W}(\tau) d\tau \qquad (A.2)$$

$$= \int_{t_{k_i}}^{t_{k_j}} \Phi(t_k, \tau) G\overline{W}(\tau) d\tau + \int_{t_{k_j}}^{t_k} \Phi(t_k, \tau) G\overline{W}(\tau) d\tau$$

$$= \Phi(t_k, t_{k_j}) W_{t_{k_i}}^{t_{k_j}} + W_{t_{k_j}}^{t_k}$$

and $$E\left\{W_{t_{k_i}}^{t_k}\left(W_{t_{k_j}}^{t_k}\right)'\right\} = Q_{t_{k_j}}^{t_k}. \qquad (A.3)$$

Similarly, for $t_{ki} \geq t_{kj}$, one has $$E\left\{W_{t_{k_i}}^{t_k}\left(W_{t_{k_j}}^{t_k}\right)'\right\} = Q_{t_{k_j}}^{t_k} \qquad (A.4)$$

The combination of eqns. (A.3) and (A.4) gives $$E\left\{W_{t_{k_i}}^{t_k}\left(W_{t_{k_j}}^{t_k}\right)'\right\} = Q_w(t_{k_i}, t_{k_j}, t_k) = \left\{ \begin{array}{l} Q_{t_{k_i}}^{t_k} \text{ if } t_{k_i} \geq t_{k_j} \\ Q_{t_{k_j}}^{t_k} \text{ if } t_{k_i} \leq t_{k_j} \end{array} \right\}. \qquad (A.5)$$

Using (2.12)

$$E\left\{\tilde{X}_i(t_{k_i} | t_{k_i})\left(W_{t_{k_j}}^{t_k}\right)'\right\} = E\left\{A_i(t_{k_i})[\Phi(t_{k_i}, t_{k_i-1})\tilde{X}_i(t_{k_i-1} | t_{k_i-1}) - \qquad (A.6)\right.$$

$$\left. W_{t_{k_i-1}}^{t_{k_i}}\right]\left(W_{t_{k_j}}^{t_k}\right)'\right\} + E\left\{K_i(t_{k_i})V_i(t_{k_i})\left(W_{t_{k_j}}^{t_k}\right)'\right\}$$

$$= -A_i(t_{k_i})E\left\{\left[W_{t_{k_i-1}}^{t_{k_i}}\left(W_{t_{k_j}}^{t_k}\right)'\right]\right\}.$$

Following the same procedure as in eqn. (A.2), it can be shown that $$E\left\{\tilde{X}_i(t_{t_{k_i}} | t_{t_{k_i}})\left(W_{t_{k_j}}^{t_k}\right)'\right\} = P_{xw}(t_{k_i}, t_{k_j}), \qquad (A.7)$$

where $P_{wx}$ is given in eqn. (3.6). Similarly, $$E\left\{W_{t_{k_j}}^{t_k} X_j(t_{k_j} | t_{k_j})'\right\} = P_{wx}(t_{k_i}, t_{k_j}), \qquad (A.8)$$

where $$P_{wx}(t_{k_i}, t_{k_j}) = \qquad (A.9)$$

$$\left\{ \begin{array}{ll} 0 & \text{if } t_{k_j} \leq t_{k_i} \\ -\Phi(t_k, t_{k_j}) Q_{t_{k_i}}^{t_{k_j}} A_j(t_{k_j})' & \text{if } t_{k_j-1} \leq t_{k_i} \leq t_{k_j} \\ -\Phi(t_k, t_{k_j}) Q_{t_{k_j-1}}^{t_{k_j}} A_j(t_{k_j})' & \text{if } t_{k_i} \geq t_{k_j-1} \end{array} \right\} = P_{xw}(t_{k_j}, t_{k_i})'.$$

Now, using eqn. (A.5), $$E\left[\left(W_{t_{k_i}}^{t_k} - W_{t_{k_n}}^{t_k}\right)\left(W_{t_{k_j}}^{t_k} - W_{t_{k_n}}^{t_k}\right)'\right] = Q_w(t_{k_i}, t_{k_k_j}, t_k) - Q_{t_{k_n}}^{t_k}. \qquad (A.10)$$

Using eqn. (2.8)

$$Q^{t_k}_{t_{k_j}} = \int_{t_{k_j}}^{t_{k_n}} \Phi(t_k, \tau)G\bar{q}(\tau)G'\Phi(t_k, \tau)' d\tau + \quad (A.11)$$

$$\int_{t_{k_n}}^{t_k} \Phi(t_k, \tau)G\bar{q}(\tau)G'\Phi(t_k, \tau)' d\tau$$

$$= \Phi(t_k, t_{k_n})Q^{t_{k_n}}_{t_{k_j}}\Phi(t_k, t_{k_n})' + Q^{t_k}_{t_{k_n}}.$$

Therefore, for $t_{ki} \leq t_{kj}$ $$E\left[\left(W^{t_k}_{t_{k_i}} - W^{t_k}_{t_{k_n}}\right)\left(W^{t_k}_{t_{k_j}} - W^{t_k}_{t_{k_n}}\right)'\right] = \Phi(t_k, t_{k_n})Q^{t_{k_n}}_{t_{k_j}}\Phi(t_k, t_{k_n})'. \quad (A.12)$$

Following the same procedure for $t_{ki} > t_{kj}$, it can be shown that in either case $$E\left[\left(W^{t_k}_{t_{k_i}} - W^{t_k}_{t_{k_n}}\right)\left(W^{t_k}_{t_{k_j}} - W^{t_k}_{t_{k_n}}\right)'\right] = \quad (A.13)$$

$$\Phi(t_k, t_{k_n})Q_w(t_{k_i}, t_{k_j}, t_{k_n})\Phi(t_k, t_{k_n})',$$

where $Q_w$ is defined in eqn. (3.5). Applying eqns. (A.7)-(A.8) and (A.12) to (A.1), and using eqns. (3.1)-(3.3), the covariance matrix eqn. (A.1) reduces to $$P_f(t_k | t_k) = \sum_{i=1}^{n-1} L_i M_{ij} L'_j + \sum_{i=1}^{n-1} L_i N_i + \sum_{i=1}^{n-1} N'_i L'_i + M_n. \quad (A.14)$$

In the following, the analytical expression of the cross covariance matrix is derived. The cross covariance matrix $P_{ij}$ between tracks i and j can be defined as $$P_{ij}(t_{k_i}, t_{k_j}) = E\left[\tilde{X}_i(t_{k_i} | t_{k_i})\tilde{X}_j(t_{k_j} | t_{k_j})'\right]. \quad (A.15)$$

The application of (2.12) to evaluate (A.15) yields $$P_{ij}(t_{k_i}, t_{k_j}) = A_i(t_{k_i})\left[\Phi(t_{k_i}, t_{k_i-1})P_{ij}(t_{k_i-1}, t_{k_j-1}) \quad (A.16)\right.$$

$$\Phi(t_{k_j}, t_{k_j-1})'\right]A_j(t_{k_j})' +$$

$$A_i(t_{k_i})E\left\{W^{t_{k_i}}_{t_{k_i-1}}\left(W^{t_{k_j}}_{t_{k_j-1}}\right)'\right\}A_j(t_{k_j})' +$$

$$K(t_{k_i})E\{V_i(t_{k_i})V_j(t_{k_j})'\}K_j(t_{k_j})'$$

$$= A_i(t_{k_i})\left[\Phi(t_{k_i}, t_{k_i-1})P_{ij}(t_{k_j}, t_{k_j-1})\Phi(t, t)' + \right.$$

$$Q_c(i, j)]A_j(t_{k_j})' +$$

$$K_i(t_{k_i})R_i(t_{k_i})K_j(t_{k_j})'\delta_{t_{k_i}t_{k_j}},$$

where $$Q_c(t_{k_i}, t_{k_j}) = E\left\{W^{t_{k_i}}_{t_{k_i-1}}\left(W^{t_{k_j}}_{t_{k_j-1}}\right)'\right\}. \quad (A.17)$$

Following the same procedure as in eqn. (A2), it can be shown that $$Q_c(i, j) = \begin{cases} 0 & \text{if } t_{k_i} \leq t_{k_j-1} \text{ or } t_{k_j} \leq t_{k_i-1} \\ Q^{t_{k_i}}_{t_{k_j-1}}\Phi(t_{k_j}, t_{k_i})' & \text{if } t_{k_i-1} \leq t_{k_j-1} < t_{k_i} \leq t_{k_j} \\ Q^{t_{k_i}}_{t_{k_i-1}}\Phi(t_{k_j}, t_{k_i})' & \text{if } t_{k_j-1} \leq t_{k_i-1} < t_{k_i} \leq t_{k_j} \\ \Phi(t_{k_i}, t_{k_j})Q^{t_{k_j}}_{t_{k_j-1}} & \text{if } t_{k_j-1} \leq t_{k_i-1} < t_{k_j} \leq t_{k_i} \\ \Phi(t_{k_i}, t_{k_j})Q^{t_{k_j}}_{t_{k_j-1}} & \text{if } t_{k_i-1} \leq t_{k_j-1} < t_{k_j} \leq t_{k_i}. \end{cases} \quad (A.18)$$

Thus one has fully defined all the terms involved in the computation of the covariance matrix of the fused track. This completes the proof of Theorem 1.

Appendix B—Proof of Theorem 2: Define $$L = [L_1 L_2 \ldots L_{n-1}] \quad (B.1)$$

so using eqns. (A.16), (3.10)-(3.11), and (3.2), one can write $P_f(t_k | t_k)$ as $$P_f(k|k) = LML' + LN + N'L' + M_n. \quad (B.2)$$

Define the performance measure as $$J = \text{trace}[P_f(k|k)] = \text{trace}[LML' + LN + N'L' + M_n]. \quad (B.3)$$

The weighting matrix L is chosen to minimize the mean square error of the fused track, i.e., to minimize the performance measure J of eqn. (B.3). A necessary condition for optimally is given by $$\frac{\partial J}{\partial L} = \frac{\partial tr[P_f(k|k)]}{\partial L} = LM + N' = 0. \quad (B.4)$$

The solution for the weighting matrix L is given by $$L = -N'M^{-1}. \quad (B.5)$$

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

The invention claimed is:

1. A method for merging data from an n-plurality of multiplexed measurement sources to a decision-maker, comprising:
receiving an n-plurality of measurements $z_i$ of the data from the respective sources within an acquisition interval $[t_{k-1}, t_k]$, where i=1, 2, ... n, wherein each measurement $z_i$ corresponds to an associated sampling period $t_{ki}$;
using n local processors to process each of the n-plurality of measurements $z_i$ to respectively obtain n-pluralities of local state estimates $X_i(t_{ki}|t_{ki})$ and local error covariances $P_i(t_{ki}|t_{ki})$;

determining an n-plurality of lag periods $\lambda_i$, each respectively corresponding to a wait duration for obtaining the local state estimates $X_i(t_{ki}|t_{ki})$ and the local error covariances $P_i(t_{ki}|t_{ki})$;

offsetting each of the n-plurality of event times $t_{ki}$ by the corresponding each of the n-plurality of the lag periods $\lambda_i$ to provide an n-plurality of offset times $t_{ki}+\lambda_i$;

supplying the n-pluralities of the local state estimates $X_i(t_{ki}|t_{ki})$ and the local error covariances $P_i(t_{ki}|t_{ki})$ to a track fusion center in accordance with the n-plurality of offset times;

combining the n-plurality of the local state estimates $X_i(t_{ki}|t_{ki})$ as a fusion state estimate $X_f(t_k|t_k)$ and the n-plurality of the local error covariances $P_i(t_{ki}|t_{ki})$ as a fusion error covariance $P_f(t_k|t_k)$ by the track fusion center within the acquisition interval $[t_{k-1}, t_k]$ for submission to the decision-maker.

2. The method according to claim 1, wherein the each measurement corresponds to a relation $$z_i(t_{ki}) = H_i(t_{ki}) X(t_{ki}) + V_i(t_{ki}),$$

where $H_i(t_{ki})$ is a measurement matrix of a source i in the n-plurality of sources, $X(t_{ki})$ is a system state at sampling period $t_{ki}$, and $V_i(t_{ki})$ is measurement noise of the source i.

3. The method according to claim 1, wherein summing the n-plurality of local state estimates $X_i(t_{ki}|t_{ki})$ further includes:

calculating an n-plurality of weighting factors $L_i$, each respectively corresponding to the local state estimates $X_i(t_{ki}|t_{ki})$;

multiplying the each of the n-plurality of local state estimates $X_i(t_{ki}|t_{ki})$ with a respective each of the n-plurality of weighting factors $L_i$ to produce an n-plurality of weighted state estimates $L_i X_i(t_{ki}|t_{ki})$; and summing the n-plurality of weighted state estimates $L_i X_i(t_{ki}|t_{ki})$ as the fusion state estimate $X_f(t_k|t_k)$.

4. The method according to claim 1, wherein summing the n-plurality of the local error covariances $P_i(t_{ki}|t_{ki})$ as the fusion error covariance $P_f(t_k|t_k)$ includes minimizing a mean square error term.

5. The method according to claim 4, wherein the fusion error covariance $P_f(t_k|t_k)$ is determined by a relation $$P_f(k|k) = \sum_{i=1}^{n-1}\sum_{j=1}^{n-1} L_i M_{ij} L_j' + \sum_{i=1}^{n-1} L_i N_i + \sum_{i=1}^{n-1} N_i L_i' + M_n,$$

where prime symbol ' represents transpose, M is an error difference matrix and N is an error difference array, such that each element therein is defined by $$M_{ij} = P_{ij}(t_{ki},t_{kj}) + \phi(t_{kj},t_{kn})[P_{nn}(t_{kn},t_{kn}) + Q_w(t_{ki},t_{kj},t_{kn})]\phi(t_{kj},t_{kn})' - P_{in}(t_{ki},t_{kn})\phi(t_{kj},t_{kn})' - \phi(t_{kj},t_{kn})P_{nj}(t_{kn},t_{kj}) - P_{xw}(t_{ki},t_{kj})\phi(t_{kj},t_k)' - \phi(t_{kj},t_k)P_{xw}(t_{ki},t_{kj})' + \phi(t_{kj},t_{kn})P_{xw}(t_{kn},t_{kj})'\phi(t_{kj},t_{kn})'$$

$$P_{ij}(t_{ki},t_{kj}) = A(t)[\phi(t_{ki},t_{ki-1})P(t_{ki-1},t_{ki-1})\phi(t_{kj},t_{kj-1})' + Q_c(t_{ki},t_{kj})]A_j(t_{kj})' + K_i(t_{ki})R_i(t_{ki})K_j(t_{kj})'\delta_{ij}$$

for $1 \leq i \leq n-1$ and $1 \leq j \leq n-1$, wherein $$Q_w(t_{ki}, t_{kj}, t_{kn}) = \begin{cases} Q_{t_{ki}}^{t_{kn}} & \text{if } t_{ki} \geq t_{kj} \\ Q_{t_{kj}}^{t_{kn}} & \text{if } t_{ki} \leq t_{kj} \end{cases}$$

$$P_{xw}(t_{ki}, t_{kj}) = \begin{cases} 0 & \text{if } t_{ki} \leq t_{kj} \\ -A(t_{ki})Q_{t_{kj}}^{t_{ki}}\Phi(t_k,t_{ki})' & \text{if } t_{ki-1} < t_{kj} \leq t_{ki} \\ -A(t_{ki})Q_{t_{kj-1}}^{t_{ki}}\Phi(t_k,t_{ki})' & \text{if } t_{kj} \leq t_{ki-1} \end{cases} \text{ and}$$

$$Q_c(t_{ki}, t_{ij}) = E\left\{W_{t_{ki-1}}^{t_{ki}}\left(W_{t_{kj-1}}^{t_{kj}}\right)'\right\},$$

and such that $\phi(t_k, t_{ki-1}) = e^{A(t_{ki}-t_{ki-1})}$ is a transition matrix for a filter difference matrix A over a time interval $(t_{ki}, t_{ki-1})$, W is state process noise, E is an expected value, Q is a process noise covariance matrix, wherein the filter difference matrix A is expressed as $A_i(t_{ki}) = [I - K_i(t_k)H_i(t_{kj})]$, such that I is an identity matrix, $K_i(t_k)$ is a process filter gain and $H_i(t_{ki})$ is a measurement matrix of a source i of the n-plurality of sources.

6. The method according to claim 1, wherein summing the n-plurality of the local state estimates $X_i(t_{ki}|t_{ki})$ as the fusion state estimate $X_f(t_k|t_k)$ and the n-plurality of the local error covariances $P_i(t_{ki}|t_{ki})$ as the fusion error covariance $P_f(t_k|t_k)$ are minimum mean square solutions of respective relations $$X_f(t_k|t_k) = \sum_{i=1}^{n} L_i X_i(t_{ki}|t_{ki})$$

$$P_f(t_k|t_k) = LML' + LN + N'L' + M_n,$$

wherein $$[L_1 \quad L_2 \quad \ldots \quad L_{n-1}] = -N'M^{-1} \text{ and}$$

$$L_n = \Phi(t_{ki}, t_{kn}) - \sum_{i=1}^{n-1} L_i \Phi(t_{ki}, t_{kn}),$$

L is an array of weighting factors, M is an error difference matrix, N is an error difference array, prime symbol ' is a transpose and $\phi$ is a transition matrix.

7. The method according to claim 1, wherein the measurements $z_i$ correspond to translational parameters.

8. The method according to claim 7, wherein the translational parameters comprise at least one of range, elevation and azimuth.

9. The method according to claim 8, wherein the fusion state estimate $X_f$ comprises at least one of a position and a velocity with respect to each of the n-plurality of sources i.

* * * * *